United States Patent [19]

Horn

[11] Patent Number: 5,196,988
[45] Date of Patent: Mar. 23, 1993

[54] POWER PEDESTAL TELEVISION AND TELEPHONE ADAPTER UNIT

[75] Inventor: Dale W. Horn, Mapleton, Minn.

[73] Assignee: General Electric Company, New York, N.Y.

[21] Appl. No.: 658,497

[22] Filed: Feb. 21, 1991

[51] Int. Cl.$^5$ .............................................. H02B 1/26
[52] U.S. Cl. .................................. 361/362; 361/357;
361/358; 361/426; 361/428; 361/429; 361/356;
174/38; 174/50; 439/535; 439/540; 439/560;
229/123; 229/141; 229/149
[58] Field of Search ............... 361/357, 356, 358, 362,
361/363, 424, 426, 427, 428, 429; 174/38, 50;
439/540, 536, 538, 535, 550, 565, 572, 560;
220/4.29, 6; 229/123, 124, 141, 142, 149

[56] References Cited

U.S. PATENT DOCUMENTS

| 24,393 | 6/1859 | Kendall | 439/573 |
| 3,716,762 | 2/1973 | Shrader | 317/107 |
| 4,307,436 | 12/1981 | Eckart et al. | 361/363 |
| 4,519,657 | 5/1985 | Jensen | 339/15 |
| 4,612,412 | 9/1986 | Johnston | 174/65 R |
| 4,674,676 | 6/1987 | Sandel | 229/142 |
| 4,951,182 | 8/1990 | Simonson et al. | 362/145 |

Primary Examiner—Leo P. Picard
Assistant Examiner—Young S. Whang
Attorney, Agent, or Firm—Richard A. Menelly

[57] ABSTRACT

A front plate adapter panel containing television and telephone hookups can be factory-installed or field-installed within existing metallic power pedestal enclosure to provide such telephone and television facility along with electric power facility.

1 Claim, 8 Drawing Sheets

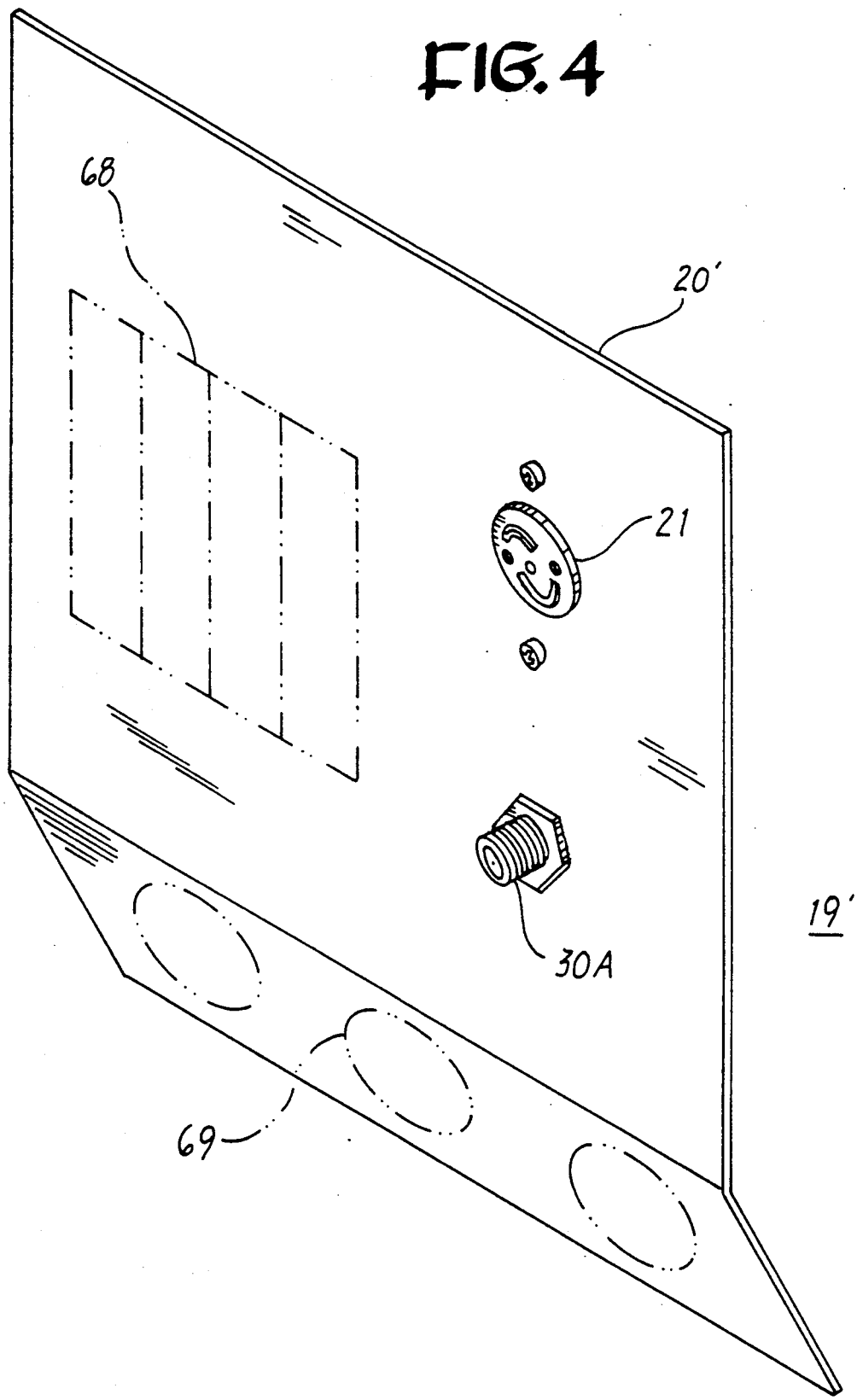

POWER PEDESTAL TELEVISION AND TELEPHONE ADAPTER UNIT

BACKGROUND OF THE INVENTION

Power pedestals used within marinas and trailer parks to provide temporary electric hookup are economically fabricated from sheet metal enclosures that usually contain a hinged metal cover that allows access to the circuit breakers and power cable sockets while affording protection to the components under inclement weather conditions.

U.S. Pat. No. 3,716,762 entitled "Meter Power Distribution Apparatus for Mobile Homes with a Detachable Front Panel for Power Outlet Fittings" describes one such metal power pedestal that includes power meters along with the circuit breakers and electrical power receptacles.

U.S. Pat. No. 4,307,436 entitled "Power Distribution Center" describes a metal power pedestal that further includes a lamp on the top of the enclosure for area illumination in the vicinity of the power pedestal.

A more recent U.S. Pat. No. 4,951,182 entitled "Modular Plastic Power-Light Pedestal Enclosure" discloses a plastic enclosure that includes television, telephone connections, circuit breakers and power receptacles along with a lamp for area illumination.

The modular plastic power-light pedestal enclosure is ideal for new installations in view of the excellent weather resistance of the plastic material and access to such a wide range of facilities within a common enclosure. However, in some applications such as with large trailer parks and marinas, the additional expense requirements with such plastic power-light pedestal enclosures would not economically justify replacement of existing metal power pedestals which adequately provide electric circuit protection as well as metering. It would be economically advantageous, to provide such existing metal power pedestals with television, telephone and lighting facilities by means of an adapter that can be either factory-installed or field-installed at a moderate cost.

One purpose of the invention accordingly, is to provide such an adapter to existing metal power pedestals for television and telephone connections. A further purpose of the invention is to provide a lighting luminaire adapter that can also be factory-installed or field-installed on existing metal power pedestals to provide such lighting at a moderate cost.

SUMMARY OF THE INVENTION

The invention comprises an adapter face plate used with a metal power pedestal to provide television and telephone facility to both new and existing power pedestals. An insulative enclosure around the telephone and television cables electrically isolates the cables from the remaining electrical components within the power pedestal enclosure. A luminaire adapter unit connected to the top of the power pedestal provides illumination to the electrical components as well as to the ground area in the vicinity of the power pedestal.

DESCRIPTION OF THE PREFERRED EMBODIMENT

Figure 1:
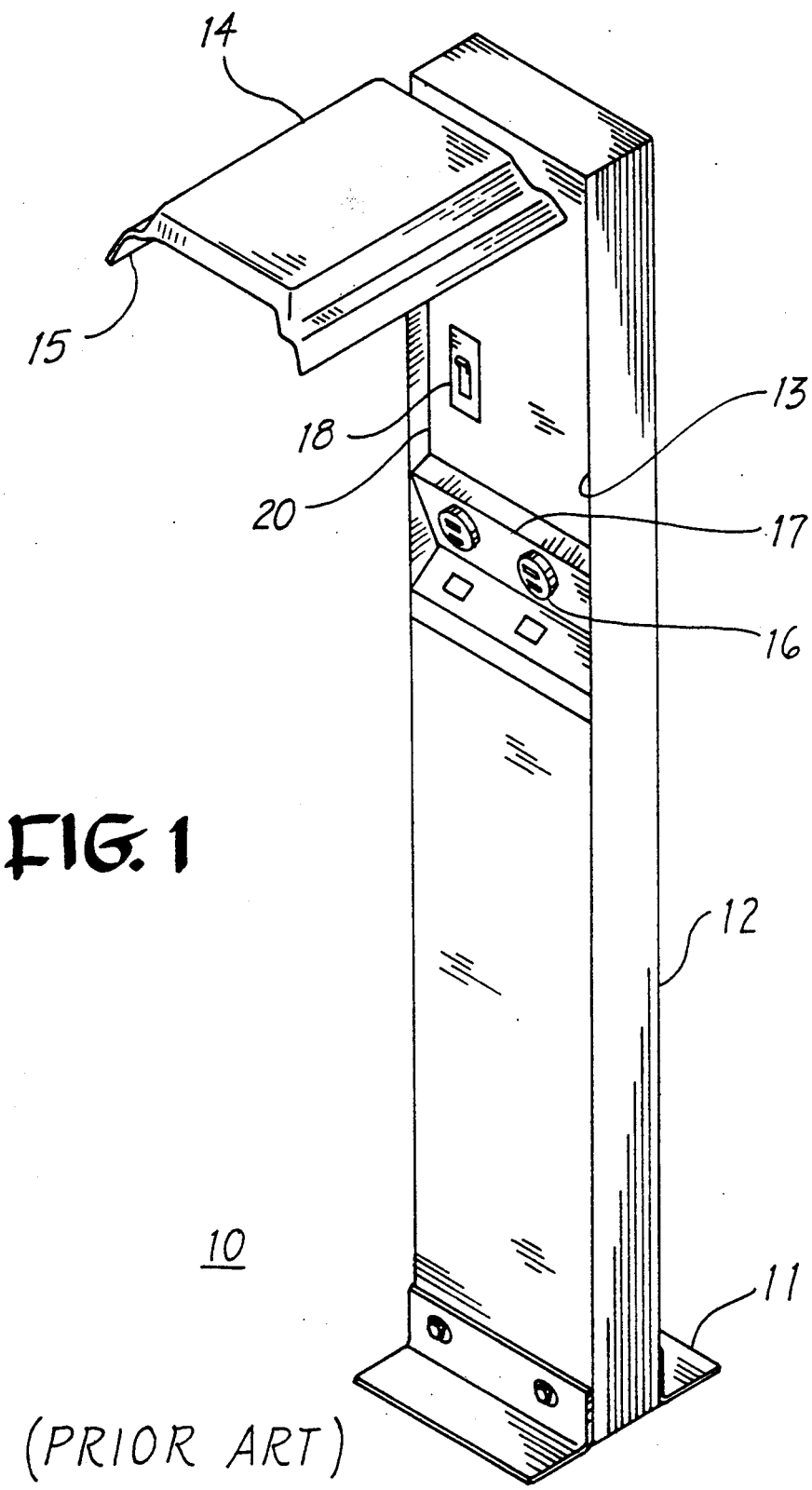
FIG. 1 is a front perspective view of a metal power pedestal in accordance with the prior art.

An existing metal power pedestal 10 which is supported on the ground in a trailer park or upon the dock in a marina by means of the base 11 is depicted in FIG. 1. The metallic housing 12 contains the power cables that connect with the electric receptacles 16 extending from the rearwardly slanting front surface 17 of the housing within the recess 13 that is protected by the hinge cover 14. Circuit breakers 18 are provided within the recess and are protected from adverse weather conditions by means of the cover 14. The offset bottom part 15 of the cover allows for the egress of the power cables (not shown) which are connected to the receptacles 16 when the cover is in its closed position. The face plate 20 that is received within the recess supports the circuit breakers 18 and other electrical interruption equipment such as ground fault circuit interrupters and electric switches which are generally employed with such power pedestals.

Figure 2:
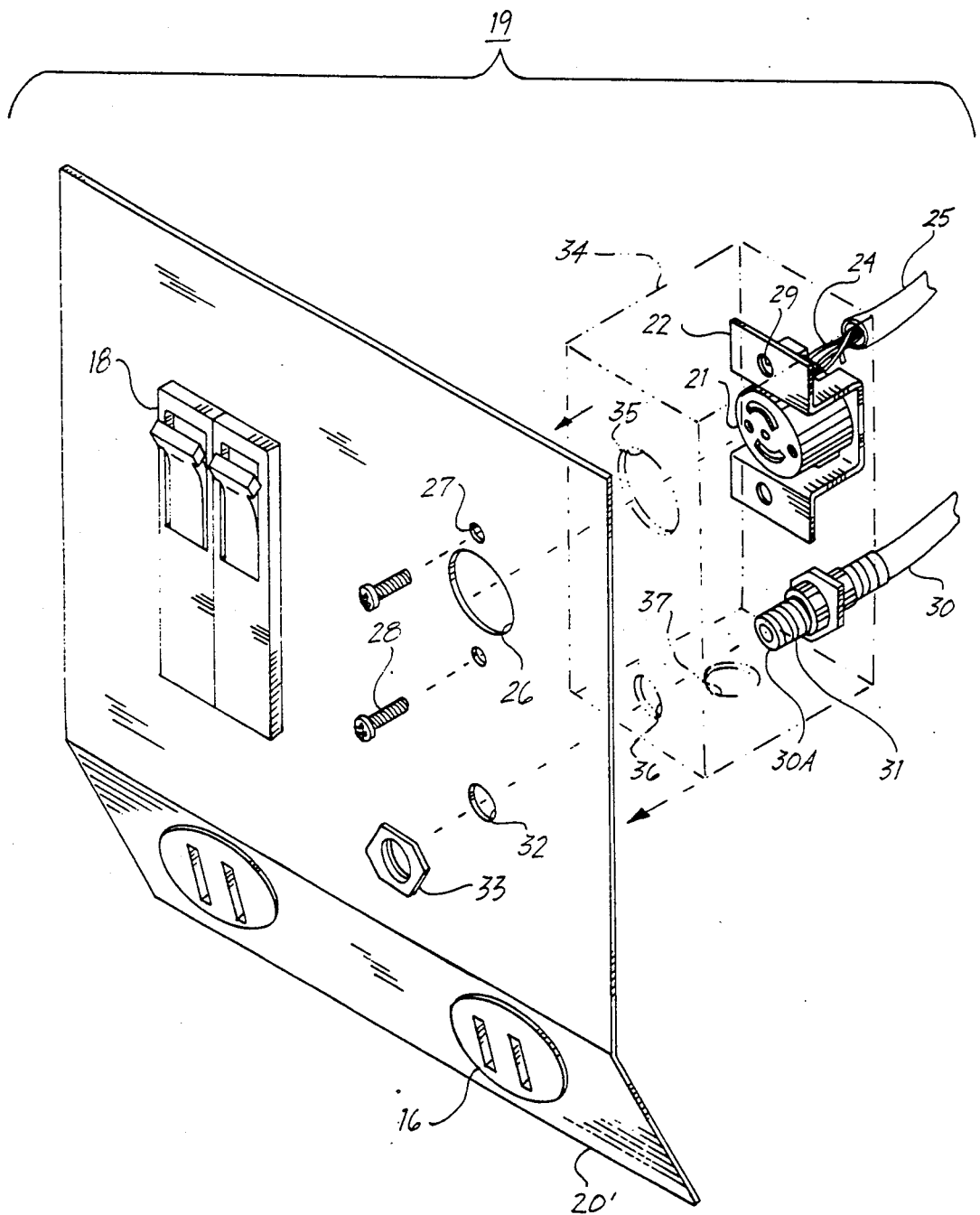
FIG. 2 is a top perspective view of the face plate adapter panel according to the invention with the telephone and television connectors in isometric projection.

In accordance with the invention, an adapter face plate 20' is used in place of the prior face plate and includes similar circuit breakers 18 and electric power receptacles 16 as shown in FIG. 2. The adapter face plate further includes an aperture 26 through which a telephone receptacle 21 extends and is attached to the adapter by means of a U-shaped bracket 22. The telephone receptacle is secured to the bracket and the bracket is attached to the back surface of the adapter face plate by means of thru-holes 27, threaded openings 29 and machine screws 28. The TV connector cable 30 is attached to the face plate adapter by positioning the TV connector 30A first through the opening 36 through the insulative plastic enclosure 34 shown in phantom, then through the aperture 32 formed in the face plate adapter before attachment by means of the threaded end 31 and the hexagonal nut 33. The telephone receptacle 21, described earlier, also passes through the insulative plastic enclosure by means of the thru-hole 35 before attachment to the face plate adapter. The telephone cable 25 and the TV cable 30 egress from the insulative enclosure by means of the aperture 37 through the bottom of the enclosure.

Figure 3:
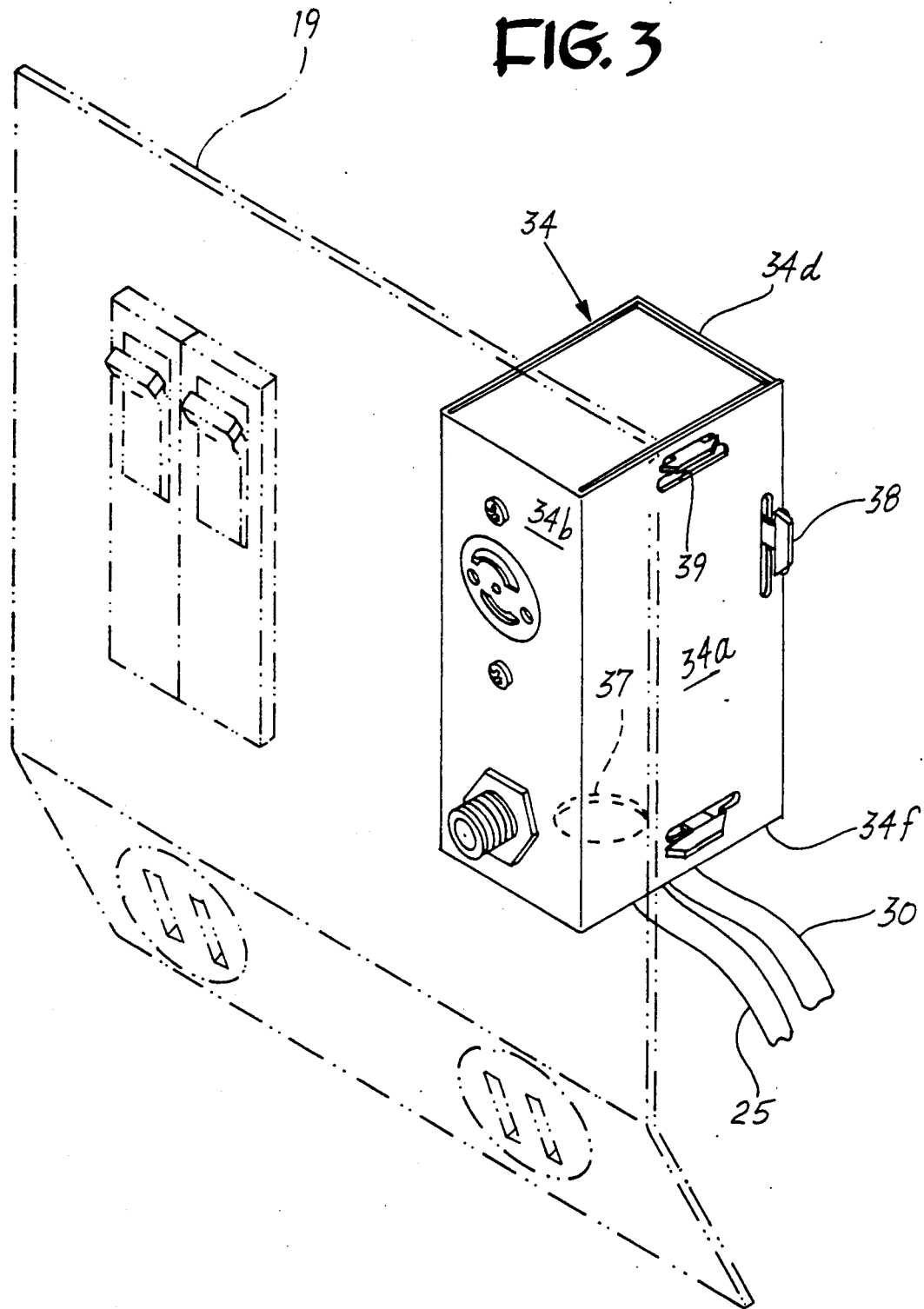
FIG. 3 is a front perspective view of the front plate adapter unit with the television and telephone connectors attached thereto.

The assembly of the arrangement of the plastic insulative enclosure 34 to the back of the face plate adapter unit is best seen by referring now to FIG. 3 where the adapter unit 19 is depicted in phantom to more clearly show the bottom 34b of the plastic insulative enclosure 34 facing the front surface of the face plate adapter unit, the side 34a extending from the back surface and top 34d extending parallel with the bottom 34b. The side is attached to the bottom by means of tabs 38 extending from the top and received within corresponding slots 39 formed in the side in the manner to be discussed below in greater detail. The telephone cable 25 and TV cable 30 pass through the aperture 37 formed in the end 34f of the insulative plastic enclosure.

A face plate adapter unit 19' shown in FIG. 4 is used for field-installation on existing power pedestal units. The telephone receptacle 21 and cable TV connector 30A are already attached to the adapter face plate 20'. To accommodate the various locations of the circuit breakers, ground fault circuit interrupters and switches that are located on the face plate, a plurality of rectangular circuit breaker knockouts 68 are formed across the major part of the adapter face plate. To accommodate the various locations of the associated cables, a plurality of circular cable openings 69 are arranged on the slanted end of the face plate adapter. If such face plate adapter is to be field-installed, the location of the existing electrical equipment is determined and the corresponding knockouts are removed in order to provide access to the existing electrical equipment.

Figure 4A:
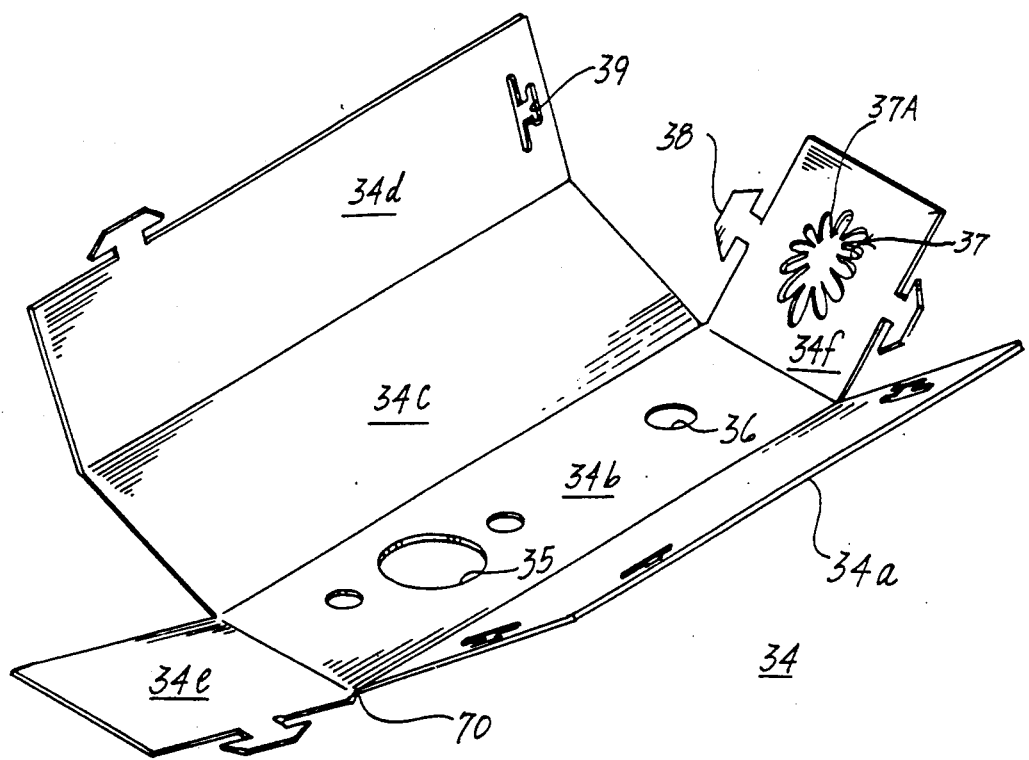
FIG. 4 is a front perspective view of the electrically insulative enclosure used with the face plate adapter of FIG. 3.

The insulative plastic enclosure 34 used with the face plate adapters of FIGS. 2-4 is depicted in FIG. 4A prior to assembly. The enclosure is formed from a single, continuous piece of plastic or fiber material and is arranged such that the sides 34a, 34c and bottom 34b, top 34d and ends 34e, 34f are all separated from each other by means of a hinge integrally-formed within the plastic sheet and generally shown at 70. The plastic sheet is formed from a uniform thickness or ply and the hinge is formed within the plastic by reducing the thickness in order to provide flexibility to the hinge. The thru-holes 35, 36 are formed within the bottom 34b to accommodate the telephone connector and TV cable connector, shown earlier and the aperture 37 is formed within the end 34f to accommodate the corresponding telephone and television cables. The striations 37A that are integrally-formed during the aperture-forming process grip the cables and provide strain relief to cables to protect the connection between the wire conductors 24 (FIG. 2) and the telephone connector when the cables are stressed externally of the enclosure. The hat-shaped tabs 38 extending from the top and ends of the enclosure are received within corresponding hat-shaped slots 39 to hold the enclosure in a box-like configuration without requiring supplemental fasteners.

Figure 5:
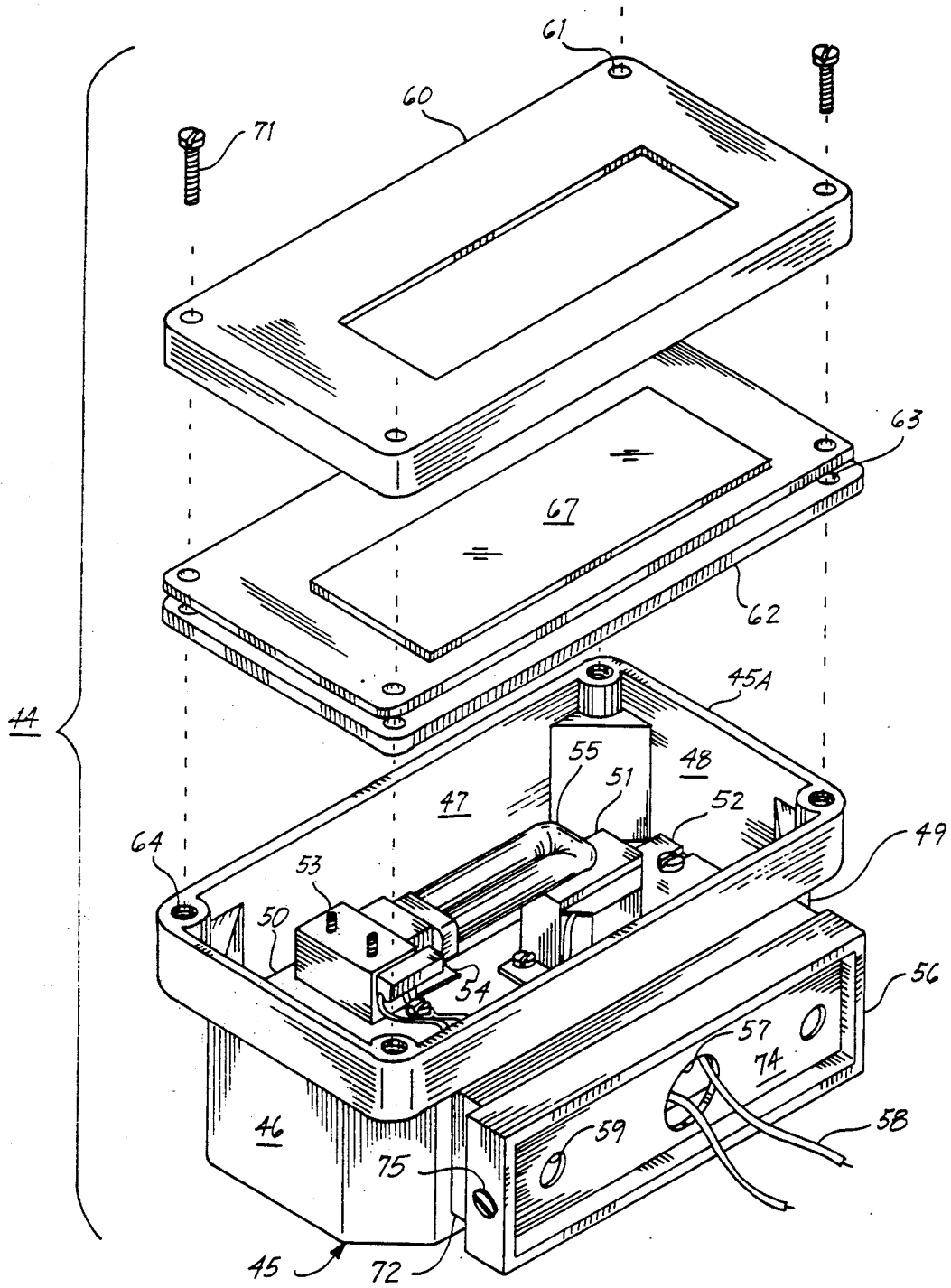
FIG. 5 is a top perspective view of the luminaire adapter unit of the invention with the luminaire cover in isometric projection.
Figure 6:
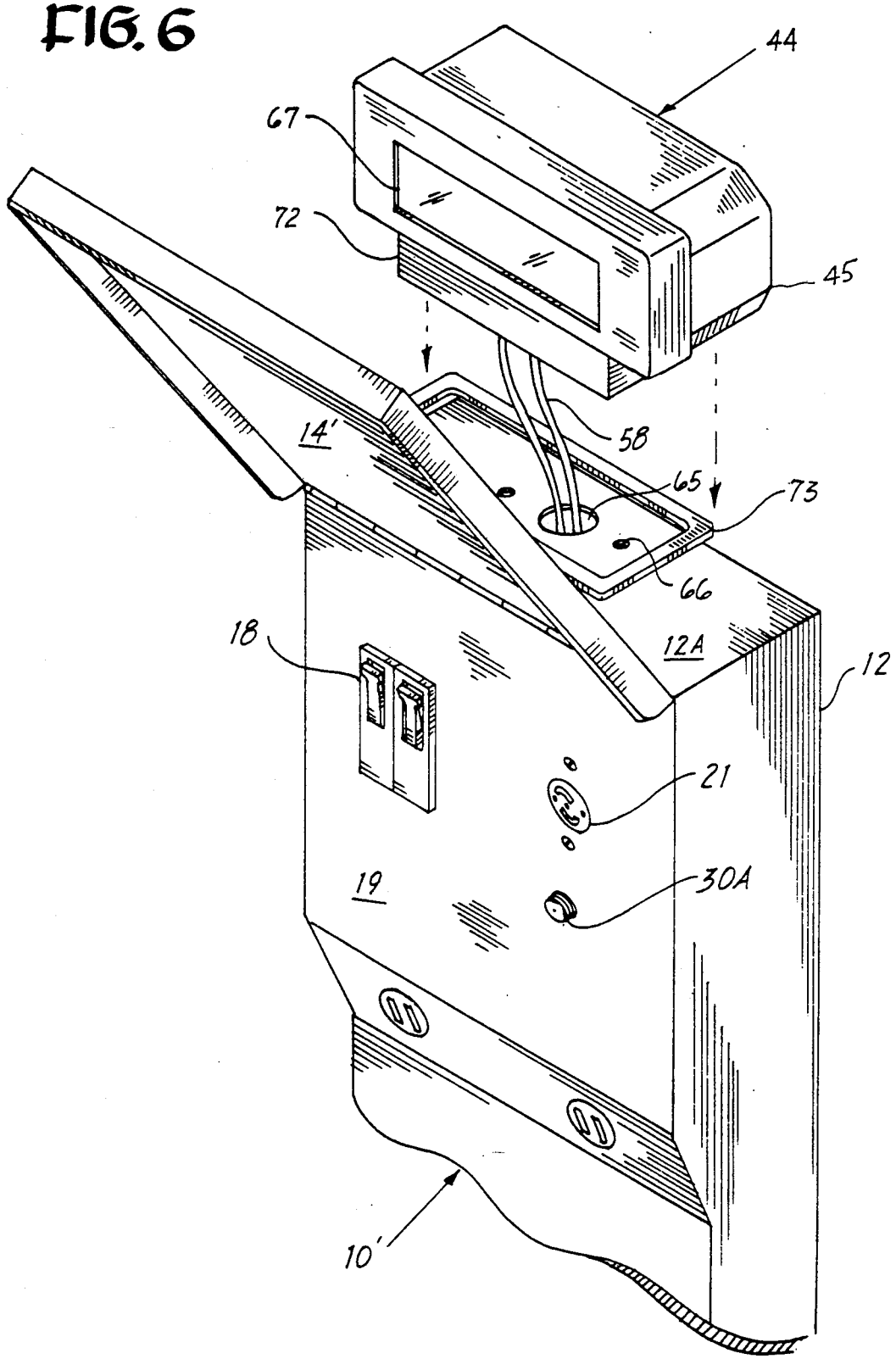
FIG. 6 is a top perspective view of a metal power pedestal having the front plate adapter and with the luminaire adapter unit of FIG. 5 in isometric projection.
Figure 7:
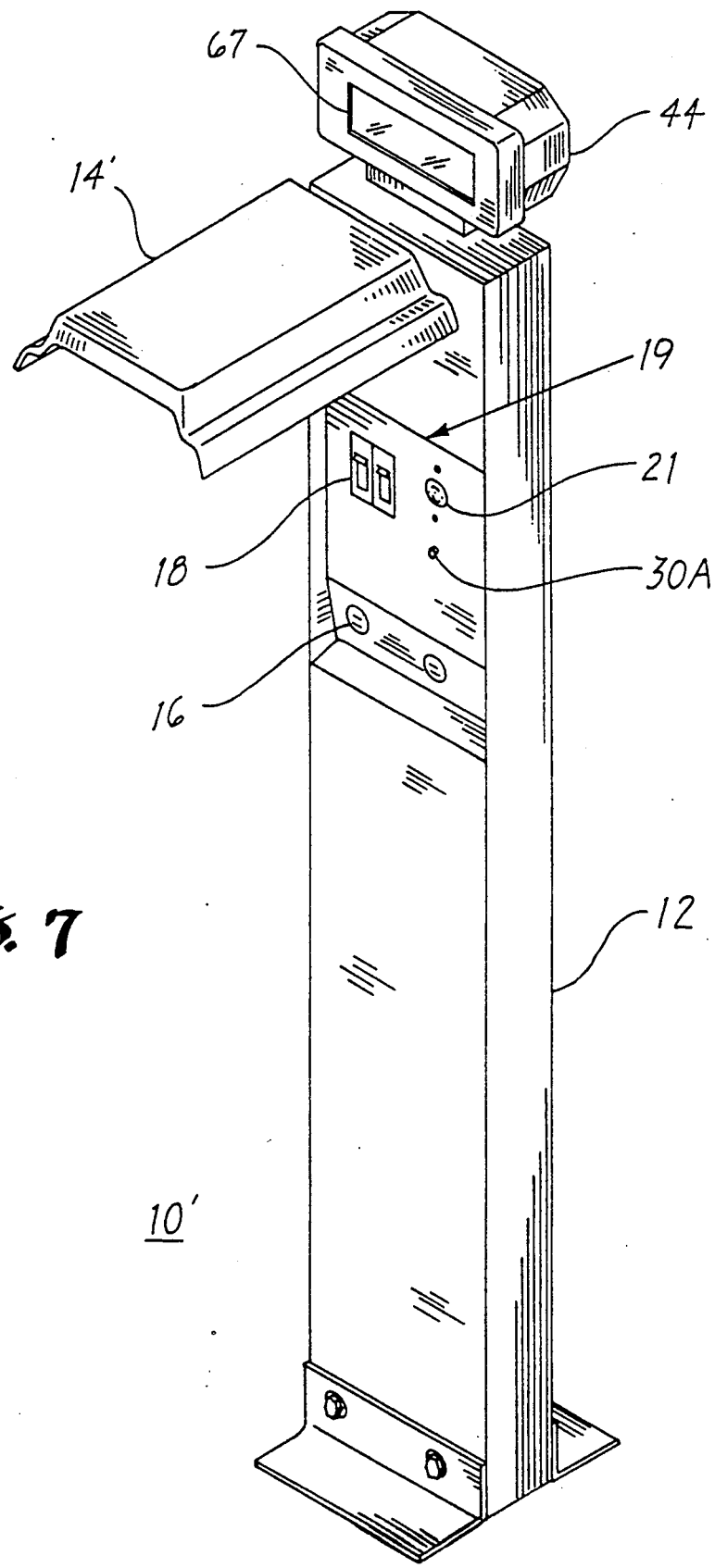
FIG. 7 is a front perspective view of a metal power pedestal having both the front plate adapter and the luminaire adapter attached thereto.

A lighting luminaire adapter unit 44 shown in FIG. 5 basically consists of a rectangular plastic base 45 with opposing side walls 46-49 upstanding from a bottom 50. A fluorescent lamp ballast 51 is attached to the bottom by means of a bracket 52 and is electrically connected with a lamp holder 53 that is attached to the bottom by means of a separate bracket 54. To provide optimum illumination in a limited area, a U-shaped fluorescent lamp 55 is inserted within the lamp holder. To accommodate attachment to a dock or other surface, a metal bracket 74 attached to the rectangular pedestal 56 by means of screws 75 is attached to the bottom of the base 45 through a gasket (not shown) within the molded plastic extension 72 of the base 45 and includes an aperture 57 for the egress of the wire conductors 58 used to provide electric power to the U-shaped lamp. A pair of thru-holes 59 on either side of the aperture are used for attaching the bracket to the surface. When the luminaire adapter unit 44 is attached to a power pedestal, such as depicted in FIGS. 6 and 7, the rectangular pedestal 56 is omitted and the extension 72 of the base 45 is directly attached to the top of the pedestal through a gasket 73 (FIG. 6). The cover 60 which includes a centrally positioned lens 67 is attached to the top perimeter 45A of the base 45 by means of an intermediate gasket 62. The cover is then fastened to the base by means of screws 71, thru-holes 61, 63 and threaded openings 64.

The attachment between the lighting luminaire adapter unit 44 and the top 12A of the housing 12 of the power pedestal 10' containing the face plate adapter unit 19 is best seen by referring now to FIG. 6. The rectangular pedestal 45 is positioned over the top 12A, the wire conductors 58 connecting with the lamp within the lighting luminaire adapter unit are directed through the wire aperture 65 formed in the top and the lighting luminaire adapter unit is directly attached to the top of the pedestal by means of the extension 72, gasket 73 and thru-holes 66. To facilitate visual access to the face plate adapter unit 19 and the circuit breakers 18, telephone receptacle 21 and the TV cable connector 30A contained thereon, the cover 14' hingeably attached to the housing 12 can be made of a transparent material, such as Lexan which is a registered trademark of GE Company for a transparent polycarbonate resin. This also provides nighttime illumination to the face plate adapter unit from the light emitted from the lamp and transmitting through the lens 67.

A metallic power pedestal 10' as shown in FIG. 7 consists of a metallic housing 12 to which a face plate adapter 19 has been attached. The power pedestal accordingly includes circuit breakers 18 and electric power receptacles 16 along with the telephone receptacle 21 and TV cable connector 30A. A lighting luminaire adapter unit 44 is attached to the top of the housing and oriented such that the light transmitting outwardly through the lens 67 provides area illumination to the ground in the vicinity of the power pedestal while the transparent cover 14' provides visual access to the electrical components contained on the face plate adapter unit under daylight illumination conditions as well as when the lamp within the lighting luminaire adapter unit is energized.

Having thus described my invention, what I claim as new and desire to secure by Letters Patent is:

1. A power pedestal television and telephone adapter panel comprising:

a rectangular front plate having a first and a second aperture;

a telephone receptacle within said first aperture arranged for accessing from a front surface of said front plate;

a television cable connector within said second aperture arranged for accessing from said front surface; and means extending from a rear surface of said front plate electrically isolating telephone and television cables connecting with said telephone receptacle and said television cable connector, said isolating means comprising a rectangular closure encompassing a part of said television cable and said telephone cable, said isolating means including a striated opening through a side of said closure, said telephone and television cables exiting said closure through said opening, said striated opening thereby providing strain relief to said cables.

* * * * *